(12) United States Patent
Nomoto et al.

(10) Patent No.: US 10,222,788 B2
(45) Date of Patent: Mar. 5, 2019

(54) PLAN GENERATING DEVICE AND PLAN GENERATING METHOD

(71) Applicant: HITACHI, LTD., Tokyo (JP)

(72) Inventors: Tazu Nomoto, Tokyo (JP); Masayasu Uozaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 15/252,808

(22) Filed: Aug. 31, 2016

(65) Prior Publication Data

US 2017/0097634 A1    Apr. 6, 2017

(30) Foreign Application Priority Data

Oct. 5, 2015    (JP) .................. 2015-197910

(51) Int. Cl.
*G06Q 10/00* (2012.01)
*G05B 19/418* (2006.01)
*G06F 9/44* (2018.01)
*G06Q 10/06* (2012.01)

(52) U.S. Cl.
CPC ....... *G05B 19/41865* (2013.01); *G06Q 10/06* (2013.01); *G05B 2219/25419* (2013.01)

(58) Field of Classification Search
CPC .... G05B 19/41865; G05B 2219/25419; G06Q 10/06; G06Q 10/087; G06Q 10/10; G06Q 10/0631; G06Q 10/063112; G06Q 10/06398; Y02P 90/20
See application file for complete search history.

(56) References Cited

U.S. PATENT DOCUMENTS 7,895,050 B2 *  2/2011  Greenstein ......... G06Q 10/0631
                                                     705/1.1
8,010,395 B2 *  8/2011  Barnard ............... G06Q 10/063
                                                     705/30
(Continued)

FOREIGN PATENT DOCUMENTS

JP       2001-117623 A     4/2001

OTHER PUBLICATIONS

Botterweck et al., EvoFM: feature-driven planning of product-line evolution, 8 pages (Year: 2010).*
(Continued)

*Primary Examiner* — Thuy Dao
(74) *Attorney, Agent, or Firm* — Volpe and Koenig, P.C.

(57) ABSTRACT

A production plan for a second base is generated that is suited to the circumstances of the second base while making use of a first base's know-how about adjusting a production plan. A storage unit is configured to store plan adjustment knowledge regarding a plan adjustment that has been made to a production plan for the first base. A generation unit is configured to generate production adjustment knowledge regarding a production adjustment that has been made at the second base, which has a production management level different from that of the first base, based on production capacity and production performance of the second base. A planning unit is configured to generate a production plan for the second base based on the plan adjustment knowledge stored in the storage unit and on the production adjustment knowledge generated by the generation unit.

7 Claims, 16 Drawing Sheets

(56) References Cited

U.S. PATENT DOCUMENTS

| | | | | |
|---|---|---|---|---|
| 8,145,589 B2* | 3/2012 | Verma | G06Q 10/06 | |
| | | | 706/50 | |
| 8,484,110 B2* | 7/2013 | Hollas | G06Q 10/0635 | |
| | | | 705/35 | |
| 8,560,366 B2* | 10/2013 | Mikurak | G06Q 10/06 | |
| | | | 705/7.12 | |
| 9,461,876 B2* | 10/2016 | Van Dusen | H04L 41/04 | |
| 2005/0222888 A1* | 10/2005 | Hosoda | G06Q 10/06315 | |
| | | | 705/7.25 | |
| 2013/0197972 A1* | 8/2013 | Taguchi | G06Q 10/0631 | |
| | | | 705/7.31 | |
| 2013/0204922 A1* | 8/2013 | El-Bakry | G06Q 10/06 | |
| | | | 709/202 | |
| 2014/0297357 A1* | 10/2014 | Zeng | G06Q 10/06 | |
| | | | 705/7.26 | |

OTHER PUBLICATIONS

Schubanz et al., Model-driven planning and monitoring of long-term software product line evolution, 5 pages (Year: 2013).*

* cited by examiner

Fig.3

21 BASE MANAGEMENT STORAGE UNIT

| BASE | MANAGEMENT CATEGORY | MANAGEMENT COEFFICIENT |
|------|---------------------|------------------------|
| P1   | L                   | 10                     |
| P2   | L                   | 0.5                    |
| P3   | H                   | ...                    |
| ⋮    | ⋮                   | ⋮                      |

22 STATE DETERMINATION INFORMATION STORING UNIT

| STATE (22a) | CALCULATION FORMULA (22b) | DETERMINATION (22c) |
|---|---|---|
| CAPACITY SHORTAGE | PROCESSING CAPACITY − LOAD | LESS THAN 0 |
| PARTS SHORTAGE | PRECEDING DAY STOCK AMOUNT + ARRIVED STOCK AMOUNT − EXPECTED STOCK RETRIEVAL AMOUNT | LESS THAN 0 |
| LOW OPERATING RATE | LOAD ÷ PROCESSING CAPACITY | EQUAL TO OR LESS THAN 0.7 |
| ⋮ | ⋮ | ⋮ |

Fig.6

24 PRODUCTION PLAN STORING UNIT

| BASE (24a) | ITEM (24b) | EQUIPMENT (24c) | LOADING DATE (24d) | PRODUCTION AMOUNT (24e) | COMPLETION DATE (24f) |
|---|---|---|---|---|---|
| P1 | PROD1 | LINE1 | 9/5 | 225 | 9/5 |
| P2 | PROD2 | LINE1 | 9/6 | 100 | 9/6 |
| ⋮ | ⋮ | ⋮ | ⋮ | ⋮ | ⋮ |

Fig.7

25 PRODUCTION CAPACITY STORING UNIT

| BASE (25a) | LINE (25b) | EQUIPMENT/ WORKER COUNT (25c) | PER-UNIT RETAINED CAPACITY (25d) |
|---|---|---|---|
| P1 | LINE1 | 10 | 8Hr |
| P1 | LINE2 | 10 | 8Hr |
| ⋮ | ⋮ | ⋮ | ⋮ |

Fig.8

26 WORK PERFORMANCE STORING UNIT

| BASE (26a) | DATE (26b) | LINE (26c) | OVERTIME (26d) | EQUIPMENT/ WORKER COUNT (26e) |
|---|---|---|---|---|
| P1 | 8/19 | LINE1 | 0Hr | 11 |
| P1 | 8/20 | LINE1 | 0Hr | 11 |
| P1 | 8/21 | LINE1 | 0Hr | 11 |
| ⋮ | ⋮ | ⋮ | ⋮ | ⋮ |

Fig.9

27 PRODUCTION ADJUSTMENT KNOWLEDGE STORING UNIT

| 27a | 27b | 27c |
|---|---|---|
| BASE | ADJUSTMENT PARAMETER | ADJUSTMENT AMOUNT/ ADJUSTMENT COUNT |
| P1 | OVERTIME | 0(12) |
| P1 | EQUIPMENT/WORKER COUNT CHANGE | 2(12) |
| ⋮ | ⋮ | ⋮ |

Fig.10

BASE KNOWLEDGE DISPLAY

BASE: P1

| ADJUSTMENT PARAMETER | CURRENT ADJUSTMENT AMOUNT/ADJUSTMENT COUNT | BASE KNOWLEDGE |
|---|---|---|
| OVERTIME | 0(3) | 0(15) |
| EQUIPMENT/WORKER COUNT | 1(3) | 2(12),1(3) |
| ⋮ | ⋮ | ⋮ |

| LINE | EQUIPMENT/ WORKER COUNT | PER-UNIT RETAINED CAPACITY |
|---|---|---|
| LINE1 | 10 | 8Hr |
| LINE2 | 10 | 8Hr |
| ⋮ | ⋮ | ⋮ |

| DATE | LINE | OVERTIME | EQUIPMENT/ WORKER COUNT |
|---|---|---|---|
| 8/19 | LINE1 | 0Hr | 11 |
| 8/20 | LINE1 | 0Hr | 11 |
| 8/21 | LINE1 | 0Hr | 11 |
| ⋮ | ⋮ | ⋮ | ⋮ | update    close

Fig.11

27 PRODUCTION ADJUSTMENT KNOWLEDGE STORING UNIT

| 27a | 27b | 27c |
|---|---|---|
| BASE | ADJUSTMENT PARAMETER | ADJUSTMENT AMOUNT /ADJUSTMENT COUNT |
| P1 | OVRETIME | 0(15) |
| P1 | EQUIPMENT/WORKER COUNT CHANGE | 2(12),1(3) |
| ⋮ | ⋮ | ⋮ |

Fig.12

41 COMBINED PLAN ADJUSTMENT KNOWLEDGE

| STATE (41a) | ADJUSTMENT PARAMETER (41b) | ADJUSTMENT AMOUNT/ADJUSTMENT COUNT (41c) |
|---|---|---|
| CAPACITY SHORTAGE | OVERTIME | <u>0(15*10)</u>,1(10), 0.5(9), 1.5(7) |
| CAPACITY SHORTAGE | PRODUCTION DATE CHANGE | −3(1), −5(1) |
| CAPACITY SHORTAGE | EQUIPMENT/WORKER COUNT CHANGE | <u>2(12*10), 1(3*10)</u>,0(50) |
| ⋮ | ⋮ | ⋮ |

PLAN GENERATING DEVICE AND PLAN GENERATING METHOD

BACKGROUND OF THE INVENTION

The present invention relates to a plan generating device and a plan generating method.

In Japanese Patent Laid-open Publication No. 2001-117623, there is disclosed a "schedule planning system capable of schedule adjustment in which an optimum schedule is planned by taking into account production environment changes that change with time".

In manufacturing industry, a production factory is sometimes built in a market distant from a main factory (hereinafter may also be referred to as "mother factory") (the distant factory may also be referred to as "child factory" in the following description) in order to respond quickly and flexibly to the needs of a globalized market. The child factory is run with the help of locally employed labor.

Generally speaking, the mother factory often has vast know-how about plan adjustment to a production plan. The child factory, on the other hand, often has little know-how about plan adjustment to a production plan. Putting the mother factory's know-how about adjusting a production plan to use in the child factory's plan adjustment to a production plan is desired in some cases.

For instance, the mother factory may find it difficult to keep a delivery date of a production plan that is generated by a plan generating device. In such cases, the mother factory, which has vast know-how about production plan adjustment, can make an adjustment to the automatically generated production plan that does not give the factory much chance of success in keeping the delivery date so that the delivery date can be kept. The child factory, on the other hand, has little know-how about making a plan adjustment to a production plan and has difficulties in determining what modification is to be made in what quantity to adjust the automatically generated production plan that does not give the factory much chance of success in keeping the delivery date. This is one of cases where putting the mother factory's know-how about adjusting a production plan to use in the child factory's plan adjustment to a production plan may be desired.

However, the mother factory's know-how about adjusting a production plan sometimes cannot be put to use as it is at the child factory due to differences between countries, cultural differences, and the like. For instance, it is difficult to put the know-how about production plan adjustment of the mother factory, where increasing the overtime of workers by a given time period is the way to keep a delivery date, to use as it is at the child factory, where working overtime is not practiced. A way to generate a production plan for the child factory that is suited to the circumstances of the child factory while making use of the mother factory's know-how about adjusting a production plan is therefore waited for.

In Japanese Patent Laid-open Publication No. 2001-117623, there is no disclosure of generating a production plan for the child factory that is suited to the circumstances of the child factory while making use of the mother factory's know-how about adjusting a production plan.

SUMMARY OF THE INVENTION

It is therefore an object of the present invention to provide a technology of generating a production plan for a second base that is suited to the circumstances of the second base while making use of a first base's know-how about adjusting a production plan.

The present application includes a plurality of means for solving at least a part of the above-mentioned problem, and an example of the plurality of means is as follows. In order to solve the above-mentioned problem, according to one embodiment of the present invention, there is provided a plan generating device, including: a storage unit configured to store plan adjustment knowledge regarding a plan adjustment that has been made to a production plan for a first base; a generation unit configured to generate production adjustment knowledge regarding a production adjustment that has been made at a second base, which has a production management level different from a production management level of the first base, based on production capacity and production performance of the second base; and a planning unit configured to generate a production plan for the second base based on the plan adjustment knowledge and on the production adjustment knowledge.

According to the present invention, the production plan for the second base can be generated that is suited to the circumstances of the second base while making use of the first base's know-how about adjusting the production plan. Problems, configurations, and effects other than those described above become apparent from the following description of an embodiment of the present invention.

BRIEF DESCRIPTION OF THE DRAWINGS

In the accompanying drawings:

FIG. 3 is a table for showing a data configuration example of a base management storage unit.

FIG. 4 is a table for showing a data configuration example of a state determination information storing unit.

FIG. 6 is a table for showing a configuration example of data that is stored in a production plan storing unit.

FIG. 7 is a table for showing a data configuration example of a production capacity storing unit.

FIG. 8 is a table for showing a data configuration example of a work performance storing unit.

FIG. 9 is a table for showing a data configuration example of a production adjustment knowledge storing unit.

FIG. 10 is a diagram for illustrating a screen example of a terminal device.

FIG. 11 is a table for showing a configuration example of updated data in the production adjustment knowledge storing unit.

FIG. 12 is a table for showing a data configuration example of combined plan adjustment knowledge.

DESCRIPTION OF THE PREFERRED EMBODIMENTS

Figure 1:
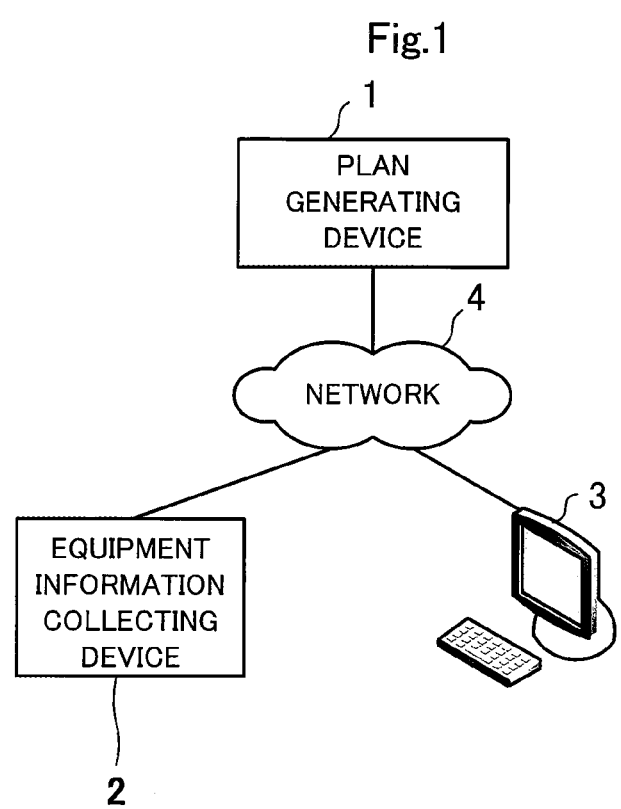
FIG. 1 is a diagram for illustrating a configuration example of a plan generating system according to an embodiment of the present invention.

In the following, a description is given of an embodiment of the present invention with reference to the drawings. FIG. 1 is a diagram for illustrating a configuration example of a plan generating system according to an embodiment of the present invention. As illustrated in FIG. 1, the plan generating system includes a plan generating device 1, an equipment information collecting device 2, and a terminal device 3. The equipment information collecting device 2 and the terminal device 3 are connected to the plan generating device 1 via a network 4, which is the Internet or the like. The plan generating device 1 is, for example, a server or a personal computer. The terminal device 3 is, for example, a personal computer or a tablet terminal.

The equipment information collecting device 2 is set up in, for example, a child factory and is connected to equipment (not shown) of the child factory. The equipment information collecting device 2 is configured to collect information about the production capacity, work performance, and the like of the child factory from equipment of the child factory, and to transmit the information to the plan generating device 1. The production capacity of the child factory is, for example, information about the number of workers at a particular line of the child factory or the running time of the line. The work performance of the child factory is, for example, information about the number of workers who have actually worked at a particular line of the child factory or an actual running time for which the line has actually been in operation.

The terminal device 3 is operated by, for example, a production manager of a business organization that owns the child factory and its mother factory. When the production manager of the business organization makes a request to generate a production plan for the mother factory of the business organization, for example, the terminal device 3 transmits the generation request to the plan generating device 1. When the production manager of the business organization makes a request to generate a production plan for the child factory of the business organization, for example, the terminal device 3 transmits the generation request to the plan generating device 1. The production manager of the business organization who operates the terminal device 3 may simply be referred to as "operator" in the following description.

The plan generating device 1 receives information about the production capacity, work performance, and the like of the child factory from the equipment information collecting device 2 over the network 4. The plan generating device 1 is also configured to generate a production plan for the mother factory or a production plan for the Child factory in response to a production plan generation request made by the terminal device 3. As described in detail below, when generating a production plan for the child factory, the plan generating device 1 generates a production plan that is suited to the circumstances of the child factory while making use of the mother factory's know how about adjusting a production plan.

While the equipment information collecting device 2 collects information about production capacity and work performance from equipment of the child factory and transmits the collected information to the plan generating device 1 in the description given above, the present invention is not limited thereto. For example, the plan generating device 1 may be connected to equipment of the child factory via the network 4 to collect production capacity and work performance from the equipment of the child factory.

Alternatively, the plan generating device 1 may receive the production capacity and work performance of the child factory from a terminal device (not shown) that is managed by the child factory. For example, a production manager of the child factory may input the production capacity and work performance of the child factory to a terminal device managed by the child factory transmit the input information to the plan generating device 1.

The plan generating device 1 may be managed by the business organization of the mother factory and the child factory. The plan generating device 1 may instead be managed by a business organization separate from the business organization that owns the mother factory and the child factory. For example, the plan generating device 1 may be managed by a service company that provides production plans for factories.

Figure 2:
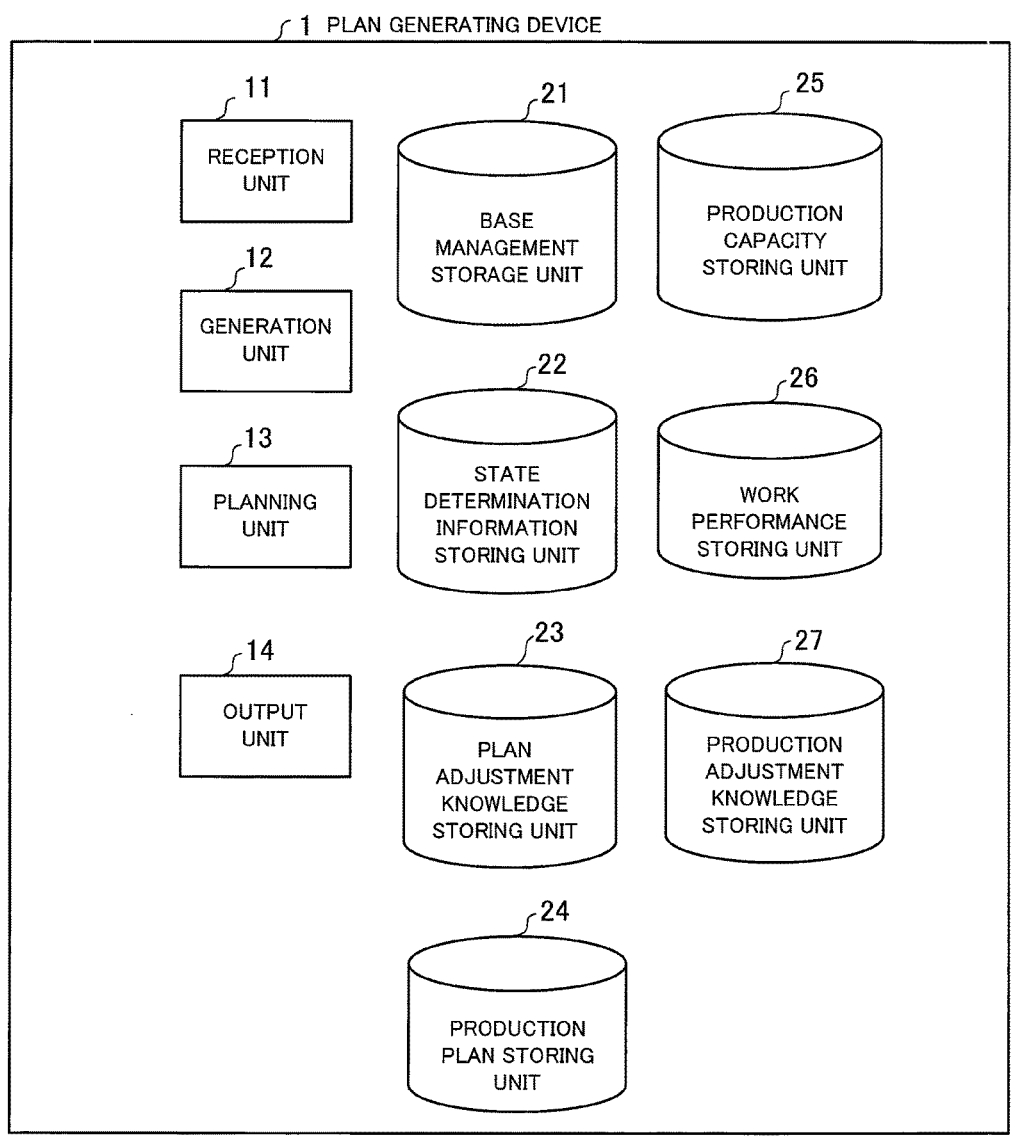
FIG. 2 is a diagram for illustrating a function block example of a plan generating device.

FIG. 2 is a diagram for illustrating a function block example of the plan generating device 1. As illustrated in FIG. 2, the plan generating device 1 includes a reception unit 11, a generation unit 12, a planning unit 13, an output unit 14, a base management storage unit 21, a state determination information storing unit 22, a plan adjustment knowledge storing unit 23, a production plan storing unit 24, a production capacity storing unit 25, a work performance storing unit 26, and a production adjustment knowledge storing unit 27.

The reception unit 11 is configured to receive information from the equipment information collecting device 2 and the terminal device 3 over the network 4. The reception unit 11 stores the received pieces of information in relevant storage units.

The generation unit 12 is configured, as described in detail below, to generate production adjustment knowledge regarding a production adjustment that has been made at the child factory, based on the production capacity of the child factory and on the actual production performance of the child factory.

The planning unit 13 is configured to generate a production plan for the mother factory in response to a request from the terminal device 3. The planning unit 13 is also configured to generate a production plan for the child factory in response to a request from the terminal device 3. As described in detail below, the planning unit 13 generates a production plan for the child factory based on the mother factory's know-how about adjusting a production plan (hereinafter may also be referred to as "plan adjustment knowledge") and on the production adjustment knowledge generated by the generation unit 12.

The output unit 14 is configured to output, to the terminal device 3, pieces of information processed by the components of the plan generating device 1 and pieces of information stored in the storage units of the plan generating device 1.

The base management storage unit 21 is configured to store information related to base management.

FIG. 3 is a table for showing a data configuration example of the base management storage unit 21. As shown in FIG. 3, the base management storage unit 21 stores in each entry a base 21*a*, a management category 21*b*, and a management coefficient 21*c*. Base management information is stored in the base management storage unit 21 in advance by the operator operating the terminal device 3.

The base 21a is identification information with which a production base is identified. For example, the base 21a is identification information for identifying mother factories and child factories.

The management category 21b is information that indicates the production management level of the base 21a. For example, a management category "H" indicates that the base 21a that is associated with this management category 21b is high in production management level and is a mother factory. A management category "L" indicates, for example, that the associated base 21a is low in production management level and is a child factory.

The management category 21b is not limited to the example given above in which the management category 21b indicates whether the base is a mother factory or a child factory. For example, the management category 21b may be classified by the degree of achievement of objective values for key performance indicators (KPIs) that are used in evaluations of production bases, such as the delivery date observation ratio, the inventory asset amount, and unplanned costs. A value that indicates an empirical value at the base 21a, such as a past production amount or the accumulated operation time, may also be used as the management category 21b.

The management coefficient 21c indicates how high or low the production management level of the base 21a is. A larger value of the management coefficient 21c indicates a higher production management level at the base 21a in question. A value larger than 1 is set as the management coefficient 21c for the base 21a whose production management level is on the rise. A value smaller than 1 is set as the management coefficient 21c for the base 21a whose production management level is on the fall, or for the newly built base 21a that has not been in operation long.

The base management information in the example of FIG. 3 indicates that a base "P1" is in the management category "L" (child factory) and has a management coefficient "10". How the management coefficient is used is described later.

The state determination information storing unit 22 of FIG. 2 is configured to store information for determining the state of a production plan that is generated by the planning unit 13.

FIG. 4 is a table for showing a data configuration example of the state determination information storing unit 22. As shown in FIG. 4, the state determination information storing unit 22 stores in each entry a state 22a, a calculation formula 22b, and determination 22c. State determination information is stored in the state determination information storing unit 22 in advance by the operator operating the terminal device 3.

The state 22a indicates the state of a production plan generated by the planning unit 13. The calculation formula 22b is a calculation formula used to determine the state 22a. The determination 22c is an index value for determining the state 22a.

The state determination information in the example of FIG. 4 indicates that a state "capacity shortage" of a production plan generated by the planning unit 13 is calculated by a formula "processing capacity−load", and that the state of a production plan is determined as "capacity shortage" when a value calculated by the calculation formula "processing capacity−load" is "less than 0".

The plan adjustment knowledge storing unit 23 of FIG. 2 is configured to store information about a plan adjustment that has been made to a production plan generated by the planning unit 13.

In the case where a production plan generated by the planning unit 13 is in the "capacity shortage" state, for example, the operator uses the terminal device 3 to input information for solving "capacity shortage" (information about a plan adjustment). Specifically, the operator solves the "capacity shortage" state of the production plan generated by the planning unit 13 by putting workers to overtime work, or by increasing the number of workers. Information about a plan adjustment that is made by the operator to a production plan generated by the planning unit 13 is stored in the plan adjustment knowledge storing unit 23 in this manner.

Figure 5:
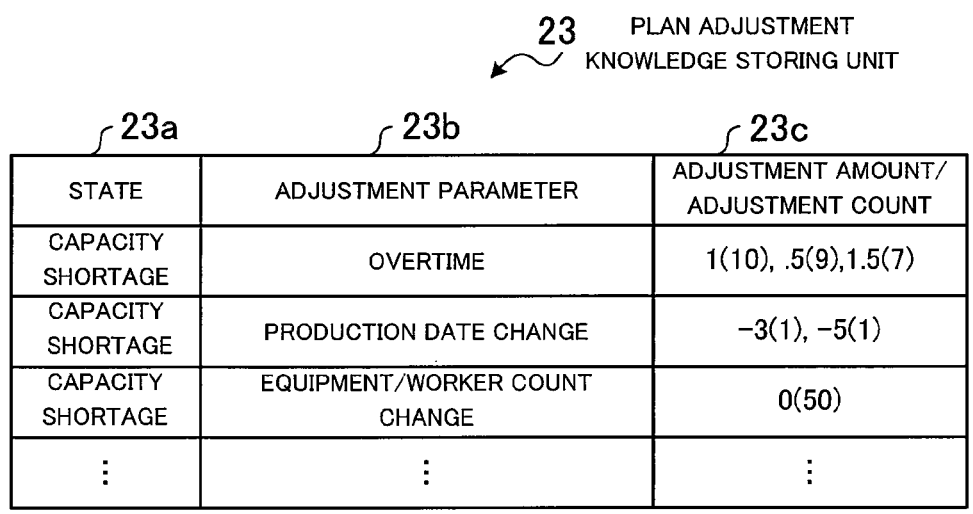
FIG. 5 is a table for showing a data configuration example of a plan adjustment knowledge storing unit.

FIG. 5 is a table for showing a data configuration example of the plan adjustment knowledge storing unit 23. As shown in FIG. 5, the plan adjustment knowledge storing unit 23 stores in each entry a state 23a, an adjustment parameter 23b, and an adjustment amount/adjustment count 23c.

The state 23a is the state of a production plan generated by the planning unit 13.

The adjustment parameter 23b indicates the type of a plan adjustment that has been made to the production plan generated by the planning unit 13. Examples of the type of a plan adjustment that is made to a production plan generated by the planning unit 13 include overtime, production date change, and equipment/worker count change.

The adjustment amount/adjustment count 23c indicates the amount of an adjustment indicated by the adjustment parameter 23b and the number of times the adjustment has been made in that adjustment amount. Each parenthesized number in FIG. 5 indicates the number of times an adjustment has been made in the indicated adjustment amount.

The information about plan adjustment in the example of FIG. 5 indicates that the operator has made a plan adjustment by "overtime" to a production plan generated by the planning unit 13 that is in the "capacity shortage" state, and that the number of times a plan adjustment has been made by "overtime: 1" (the unit is in hours, for example) is "10", whereas the number of times a plan adjustment has been made by "overtime: 5" is "9" and the number of times a plan adjustment has been made by "overtime: 1.5" is "7". The information also indicates that the operator has made a plan adjustment by "production date change" to a production plan generated by the planning unit 13 that is in the "capacity shortage" state, and that the number of times a plan adjustment has been made by "production date change: −3" (the minus sign indicates that the production date is pushed off) is "1", whereas the number of times a plan adjustment has been made by "production date change: −5" is "1".

The adjustment amount may be expressed in difference or proportion. Difference is preferred in the case where the production scale is the same from one base to another, and proportion is preferred in the case where the production scale varies from one base to another. Values of the adjustment amount are stored in, for example, descending order of adjustment count.

The production plan storing unit 24 of FIG. 2 is configured to store a production plan generated by the planning unit 13. The planning unit 13 is configured, as described in detail below, to generate a production plan for the mother factory in response to an instruction issued by the operator to generate the mother factory's production plan, and to generate a production plan for the child factory in response to an instruction issued by the operator to generate the child factory's production plan.

FIG. 6 is a table for showing a configuration example of data that is stored in the production plan storing unit 24. As shown in FIG. 6, the production plan storing unit 24 stores in each entry a base 24a, an item 24b, equipment 24c, a loading date 24d, a production amount 24e, and a completion date 24f.

The base 24a is identification information with which a base (a mother factory or a child factory) is identified. The item 24b is an item produced at the base 24a. The equipment 24c is equipment used to produce the item 24b at the base 24a. The loading date 24d is a date at which parts and the like for producing the item 24b are loaded in the equipment 24c. The production amount 24e is the amount of the item. 24b produced. The completion date 24f is a date at which the item 24b is finished.

In the example of FIG. 6, according to a production plan for the base "P1", an item "PROD1" is produced at the base "P1" with equipment "LINE1" in a production amount "225" by loading parts on a loading date "9/5", and is finished on a completion date "9/5".

The production capacity storing unit 25 of FIG. 2 is configured to store information about the production capacity of a child factory (a factory for which the management category "L" is stored in FIG. 3). The production capacity of each child factory is collected regularly by the equipment information collecting device 2 and stored in the production capacity storing unit 25.

FIG. 7 is a table for showing a data configuration example of the production capacity storing unit 25. As shown in FIG. 7, the production capacity storing unit 25 stores in each entry a base 25a, a line 25b, an equipment/worker count 25c, and a per-unit retained capacity 25d.

The base 25a is identification information with which a base (a child factory) is identified. The line 25b is identification information with which a manufacturing line set up at the base 25a is identified. The equipment/worker count 25c indicates the number of people working at the line 25b. The per-unit retained capacity 25d indicates working hours per worker.

The production capacity data in the example of FIG. 7 indicates that, at a line "LINE1" of the base "P1", the worker count is "10" with the working hours per worker set to "8 hrs".

The work performance storing unit 26 of FIG. 2 is configured to store the past record of work actually performed at a child factory. The work performance of each child factory is collected regularly by the equipment information collecting device 2 and stored in the work performance storing unit 26.

FIG. 8 is a table for showing a data configuration example of the work performance storing unit 26. As shown in FIG. 8, the work performance storing unit 26 stores in each entry a base 26a, a date 26b, a line 26c, an overtime 26d, and an equipment/worker count 26e.

The base 26a is identification information with which a base (a child factory) is identified. The date 26b is a date at which work has been performed at the base 26a. The line 26c is identification information for identifying a line at the base 26a were the work has been performed. The overtime 26d indicates the length of overtime put in at the line 26c. The equipment/worker count 26e indicates the number of people who have actually worked at the line 26c.

The work performance data in the example of FIG. 8 indicates that, at the line "LINE1" of the base "P1", the overtime and the worker count on a date "8/9" are "0 hrs" and "11", respectively.

The number of workers (production capacity) assigned to the line "LINE1" of the base "P1" is "10" according to the equipment/worker count 25c of FIG. 7. In the work actually performed at the line "LINE1" of the base "P1", on the other hand, the number of workers is "11" as indicated by the equipment/worker count 26e of FIG. 8, which means that one worker has been added.

The production adjustment knowledge storing unit 27 of FIG. 2 is configured to store information about a production adjustment (production adjustment knowledge) that has been made at a base whose production management level is "L" (a child factory). The production adjustment knowledge is generated by the Generation unit 12 and stored in the production adjustment knowledge storing unit 27.

FIG. 9 is a table for showing a data configuration example of the production adjustment knowledge storing unit 27. As shown in FIG. 9, the production adjustment knowledge storing unit 27 stores in each entry a base 27a, an adjustment parameter 27b, and an adjustment amount/adjustment count 27c.

The base 27a is identification information with which a base (a child factory) is identified.

The adjustment parameter 27b indicates the type of a production adjustment that has been made at the child factory. Examples of the type of a production adjustment made at a child factory include overtime and equipment/worker count change.

The adjustment amount/adjustment count 27c indicates the amount of an adjustment indicated by the adjustment parameter 27b and the number of times the adjustment has been made in that adjustment amount.

The production adjustment knowledge in the example of FIG. 9 indicates that a production adjustment has been made at a child factory that is the base "P1" by overtime in an adjustment amount of "0" hours for "12" times. In other words, the number of times a child factory that is the base "P1" has not made a production adjustment by overtime is "12". The production adjustment knowledge also indicates that a production adjustment has been made at the child factory that is the base "P1" by increasing the equipment/worker count by "two workers" for "12" times.

The Generation unit 12 generates production adjustment knowledge of a child factory as the one shown in FIG. 9 based on the production capacity of the child factory (see FIG. 7) and on the actual production performance of the child factory (see FIG. 8). For example, when there is a change to at least one of production capacity and production performance collected by the equipment information collecting device 2 (e.g., a change to production capacity or the reception of new production performance collected), the generation unit 12 displays an alert on a display device of the terminal device 3.

FIG. 10 is a diagram for illustrating a screen example of the terminal device 3. A screen 30 illustrated in FIG. 10 is displayed on the display device of the terminal device 3 when, for example, the operator accesses the plan generating device 1 based on the alert displayed on the display device of the terminal device 3. The screen 30 displays a pull-down menu 31, a production capacity area 32, a work performance area 33, and a production adjustment knowledge change area 34.

The pull-down menu 31 is for selecting a base whose information is to be displayed on the screen 30.

The production capacity area 32 is an image area in which the production capacity of the child factory in question is displayed. For example, the production capacity of the base "P1" that is shown in FIG. 7 is displayed in the production capacity area 32.

The work performance area 33 is an image area in which the work performance of the child factory is displayed. For example, the work performance of the base "P1" that is shown in FIG. 8 is displayed in the work performance area 33.

The production adjustment knowledge change area 34 is a screen area in which changes to production adjustment knowledge are displayed. In the production adjustment knowledge change area 34, an "adjustment parameter" indicates an adjustment parameter that has been used to make a production adjustment at the base "P1" (a child factory) this time, and a "current adjustment amount/adjustment count" indicates an amount in which the production adjustment using the indicated adjustment parameter has been made at the base "P1" this time, and the number of times the adjustment has been made.

In the example of FIG. 10, information displayed in the work performance area 33 indicates that actual work performance at "LINE1" of the base "P1" in terms of "overtime" is "0" on dates "8/19", "8/20", and "8/21" each. The current adjustment amount/adjustment count of an adjustment parameter "overtime" in the production adjustment knowledge change area 34 is therefore "0(3)".

Information displayed in the production capacity area 32 in the example of FIG. 10 indicates that production capacity at "LINE1" of the base "P1" in terms of "equipment/worker count" is "10". The actual "equipment/worker count" at "LINE1" of the base "P1", on the other hand, is "11" on dates "8/19", "8/20", and "8/21" each, according to the displayed information of the work performance area 33. The current adjustment amount/adjustment count of an adjustment parameter "equipment/worker count change" in the production adjustment knowledge change area 34 is therefore "1 (3)". The value "1 (3)" indicates that an increase by "1" as the adjustment parameter "equipment/worker count change" has been carried out "three times" this time.

"Base knowledge" in the production adjustment knowledge change area 34 is past production adjustment knowledge on which the "current adjustment amount/adjustment count" of the production adjustment made this time is reflected. The "base knowledge" of FIG. 10 is obtained by, for example, making the "current adjustment amount/adjustment count" in the production adjustment knowledge change area 34 of FIG. 10 reflected on the adjustment amount/adjustment count 27c of FIG. 9.

The generation unit 12 can recognize a production adjustment made at a child factory by comparing production capacity of the production capacity storing unit 25 which is shown in FIG. 7 to work performance of the work performance storing unit 26 which is shown in FIG. 8. For instance, as described in the example of FIG. 10, a child factory that is the base "P1" has dealt with a shortage of capacity necessary to produce products as planned (has made a production adjustment) by increasing the equipment/worker count by "1" on dates "8/19", "8/20", and "8/21" each. The child factory that is the base "P1" has also made a production adjustment on dates "8/19", "8/20", and "8/21" each without overtime work. The generation unit 12 can recognize the production adjustments made this time by comparing the production capacity of the production capacity storing unit 25 and the work performance of the work performance storing unit 26. The generation unit 12 then updates the production adjustment knowledge of the production adjustment knowledge storing unit 27.

FIG. 11 is a table for showing a configuration example of update data in the production adjustment knowledge storing unit 27. In FIG. 11, data items that are identical to the ones in FIG. 9 are denoted by the same reference symbols. The adjustment amount/adjustment count 27c in the production adjustment knowledge storing unit 27 of FIG. 11 is updated from the adjustment amount/adjustment count 27c of FIG. 9. Underlined portions of FIG. 11 are portions updated by the generation unit 12.

Plan generation knowledge of a child factory on which plan adjustment knowledge of its mother factory is reflected is described. The planning unit 13 generates a production plan for the child factory in response to a request made by the operator of the terminal device 3 to generate the child factory's production plan. When generating the production plan, the planning unit 13 generates the child factory's plan adjustment knowledge on which the mother factory's plan adjustment knowledge is reflected. The planning unit 13 uses the generated plan adjustment knowledge of the child factory to generate a production plan for the child factory.

The planning unit 13 generates the child factory's plan adjustment knowledge by adding, to plan adjustment knowledge that is stored in the plan adjustment knowledge storing unit 23, production adjustment knowledge of the child factory for which the production plan is to be generated (the generated plan adjustment knowledge may hereinafter be also referred to as "combined plan adjustment knowledge"). The planning unit 13 takes the management coefficient 21c of the base management storage unit 21 into account when generating the combined plan adjustment knowledge.

FIG. 12 is a table for showing a data configuration example of the combined plan adjustment knowledge. As shown in FIG. 12, combined plan adjustment knowledge 41 includes a state 41a, an adjustment parameter 41b, and an adjustment amount/adjustment count 41c. The state 41a, the adjustment parameter 41b, and the adjustment amount/adjustment count 41c are the same as the state 23a, the adjustment parameter 23b, and the adjustment amount/adjustment count 23c in the plan adjustment knowledge storing unit 23 described with reference to FIG. 5, and descriptions thereof are omitted. The planning unit 13 stores the combined plan adjustment knowledge 41 generated in, for example, a storage device in which information is temporarily stored.

In the description given here, the planning unit 13 generates a production plan for the base "P1" (the base "P1" is a child factory in the example of FIG. 3). The planning unit 13 in this case generates combined plan adjustment knowledge by adding production adjustment knowledge of the base "P1" to plan adjustment knowledge of the mother factory.

For example, the planning unit 13 adds production adjustment knowledge of the base "P1" shown in FIG. 11 to plan adjustment knowledge shown in FIG. 5. Underlined portions of FIG. 12 indicate the production adjustment knowledge of the base "P1" that is shown in FIG. 11 and that is added to the plan adjustment knowledge of FIG. 5.

When adding the production adjustment knowledge of the base "P1", the planning unit 13 multiplies an adjustment count (a parenthesized number in FIG. 12) indicated by the adjustment amount/adjustment count 41c by a value that is associated with the production management level of the base "P1" (the management coefficient 21c in FIG. 3).

For example, the number of times an adjustment has been made by overtime "0" at the base "P1" is "15" in the example of FIG. 11, and the planning unit 13 multiplies the adjustment count "15" by a management coefficient "10" of the base "P1" that is shown in FIG. 3.

In other words, the influence of the production adjustment knowledge of the base "P1" for which a production plan is generated over an adjustment count indicated by the adjustment amount/adjustment count 41c of the combined plan adjustment knowledge 41 is greater when the production management level of the base "P1" is higher.

An operation example of the plan generating device 1 is described below. The operation of the plan generating device 1 can be divided into, for example, the operation of generating plan adjustment knowledge of a mother factory, the operation of generating production adjustment knowledge of its child factory, and the operation of generating a production plan for the child factory.

Figure 13:
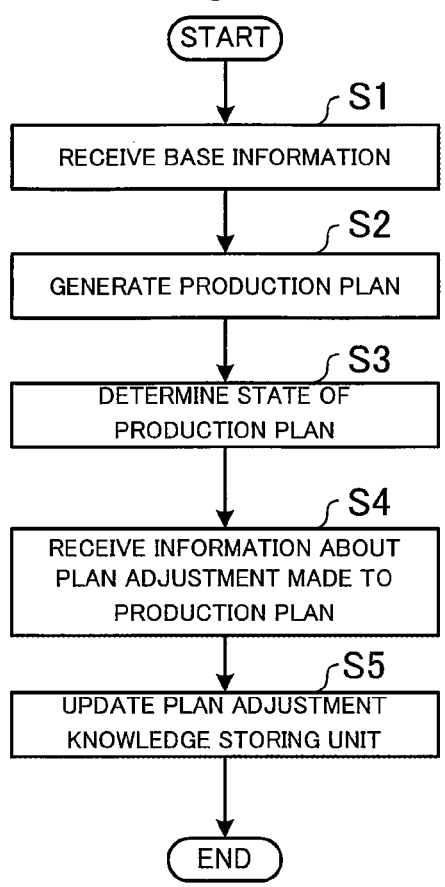
FIG. 13 is a flow chart for illustrating an example of the operation of generating plan adjustment knowledge.

FIG. 13 is a flow chart for illustrating an example of the operation of generating plan adjustment knowledge. The operator of the terminal device 3 accesses the plan generating device 1 to make a request to generate a production plan for the mother factory. When making the request, the operator of the terminal device 3 inputs to the terminal device 3 base information of the mother factory for which a production plan is to be generated.

The planning unit 13 first receives from the terminal device 3 base information of the mother factory for which a production plan is to be generated (Step S1).

The planning unit 13 next generates a production plan for a base whose base information has been received in Step S1 (the mother factory) (Step S2). For example, the planning unit 13 generates a production plan for the mother factory by referring to a storage unit (not shown in FIG. 2) in which a shipment plan, a parts list, process information, inventory information, expected stock arrival information, process identification information, setup time information, or the like is stored. The planning unit 13 can use, for example, a technology disclosed in Japanese Patent Laid-open Publication No. 2005-301466 to generate the production plan.

The planning unit 13 next refers to the state determination information storing unit 22 to determine the state of the production plan generated in Step S2 (Step S3).

The state of a production plan means numerical values that the operator minds when making a production plan, and can roughly be divided into, for example, executability and productivity. Executability is measured by, for example, whether the production load of a process is within the processing capacity required for the process, whether parts are available in a necessary amount when needed, or whether the delivery date can be kept. Productivity is measured by the total setup time, the stock amount, the load factor of the process, or the like. The state of a production plan is not limited to those described above, which are merely an example. It can also be said that the state of a production plan is an evaluation of the soundness of the production plan generated by the planning unit 13.

The production plan generated in Step S2 and the state of the production plan determined in Step S3 are displayed on the display device of the terminal device 3. The operator of the terminal device 3 adjusts the production plan based on the production plan and the state of the production plan that are displayed on the display device of the terminal device 3. In the case where the state of the production plan displayed on the display device of the terminal device 3 is "capacity shortage", for example, the operator of the terminal device 3 adjusts the production plan so that the "capacity shortage" is solved.

The planning unit 13 next receives information about the plan adjustment made to the production plan which is input by the operator with the use of the terminal device 3 (Step S4).

The planning unit 13 next updates the plan adjustment knowledge storing unit 23 based on the information about the plan adjustment made to the production plan which has been input in Step S4 (Step S5).

Through the processing described above, the mother factory's know-how about plan adjustment (plan adjustment knowledge) made to a production plan is stored in the plan adjustment knowledge storing unit 23.

The planning unit 13 stores in the production plan storing unit 24 the production plan that is generated in Step S2 or the production plan to which a plan adjustment is made in Step S4.

Figure 14:
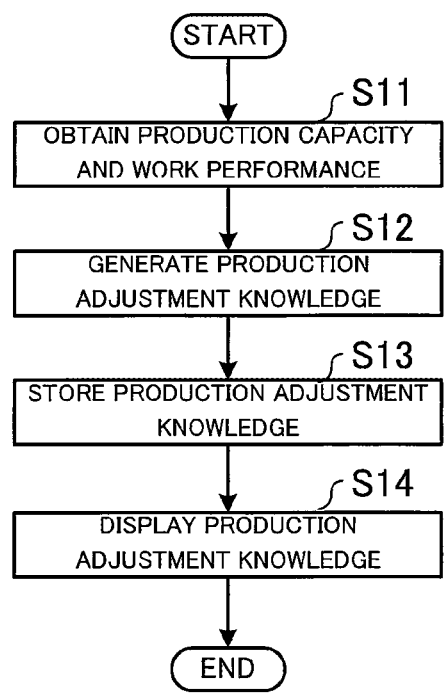
FIG. 14 is a flow chart for illustrating an example of the operation of generating production adjustment knowledge.

FIG. 14 is a flow chart for illustrating an example of the operation of generating production adjustment knowledge. The generation unit 12 receives production capacity and work performance that have been collected for a base whose production management level is "L" (a child factory) by the equipment information collecting device 2. When there is a change to the production capacity or work performance received from the equipment information collecting device 2, the generation unit 12 stores the changed production capacity or work performance in the production capacity storing unit 25 or the work performance storing unit 26. The generation unit 12 then executes the following processing.

The generation unit 12 first refers to the production capacity storing unit 25 and the work performance storing unit 26 to obtain the production capacity and work performance of the child factory (Step S11).

The generation unit 12 next generates production adjustment knowledge about a production adjustment that has been made at the child factory, based on the production capacity and work performance obtained in Step S11. For example, the generation unit 12 compares the production capacity and work performance obtained in Step S11 to each other to generate the production adjustment knowledge.

The generation unit 12 next stores the production adjustment knowledge generated in Step S12 in the production adjustment knowledge storing unit 27 (Step S13).

The generation unit 12 next displays the production adjustment knowledge generated in Step S12 on the display device of the terminal device 3. (Step S14).

Through the processing described above, a production adjustment (production adjustment knowledge) made at the child factory is stored in the production adjustment knowledge storing unit 27.

Figure 15:
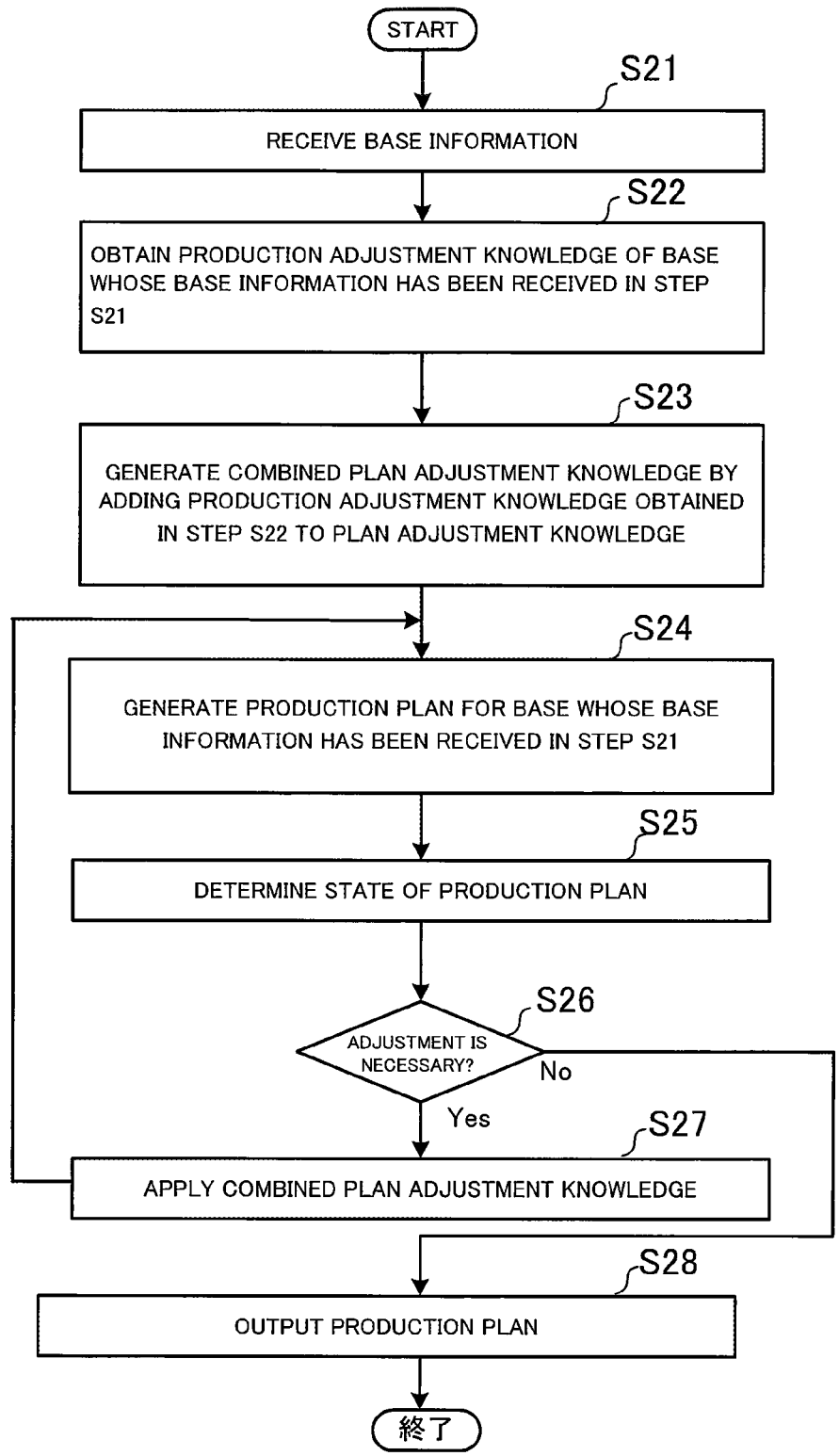
FIG. 15 is a flow chart for illustrating an example of the operation of generating a production plan for a child factory.

FIG. 15 is a flow chart for illustrating an example of the operation of generating a production plan for a child factory. The operator of the terminal device 3 accesses the plan generating device 1 to make a request to generate a production plan for a child factory. When making the request, the operator of the terminal device 3 inputs to the terminal device 3 base information of the child factory for which a production plan is to be generated.

The planning unit 13 first receives from the terminal device 3 base information of the child factory for which a production plan is to be generated (Step S21).

The planning unit 13 next obtains production adjustment knowledge of the base whose base information has been received in Step S21 (Step S22). For example, the planning unit 13 refers to the production adjustment knowledge storing unit 27 to obtain production adjustment knowledge of the base whose base information has been received in Step S21.

The planning unit 13 next adds the production adjustment knowledge obtained in Step S22 to plan adjustment knowledge stored in the plan adjustment knowledge storing unit 23, thereby generating combined plan adjustment knowledge (Step S23). The planning unit 13 generates, for example, the combined plan adjustment knowledge 41 shown in FIG. 12.

The planning unit 13 next generates a production plan for the base (the child factory) whose base information has been received in Step S21 (Step S24). The planning unit 13 generates a production plan for the child factory by the same method that is used in Step S2 of FIG. 13.

The planning unit 13 next refers to the state determination information storing unit 22 to determine the state of the production plan generated in Step S24 (Step S25).

The planning unit 13 next determines whether or not the production plan needs to be adjusted based on the state of the production plan that has been determined in Step S25 (Step S26). In the case where the state of the production plan is determined in Step S25 as "capacity shortage", for example, the planning unit 13 determines that the production plan needs an adjustment. When determining that the production plan needs an adjustment ("Yes" in Step S26), the planning unit 13 moves the processing to Step S27. When determining that the production plan does not need an adjustment ("No" in Step S26), the planning unit 13 moves the processing to Step S28.

When it is determined in Step S26 that the production plan needs to be adjusted ("Yes" in Step S26), the planning unit 13 uses the combined plan adjustment knowledge 41 generated in Step S23 to generate a production plan (Step S27). To generate this production plan, the planning unit 13 sequentially selects the highest adjustment count that is recorded as the adjustment amount/adjustment count 41c in the combined plan adjustment knowledge 41 and the adjustment parameter 41b that is associated with the highest adjustment count recorded as the adjustment amount/adjustment count 41c, and generates the production plan based on the selected adjustment amount/adjustment count 41c and adjustment parameter 41b. The planning unit 13 then moves the processing to Step S25.

In the example of FIG. 12, the highest adjustment count recorded as the adjustment amount/adjustment count 41c is associated with an adjustment parameter "overtime: 0", and the planning unit 13 therefore generates (regenerates) a production plan based on the parameter "overtime: 0".

In the case of "overtime: 0", the state of the generated production plan is the same as before, and the planning unit 13 therefore moves the processing to Step S25 and then to Step S26 to execute Step S27 again. The planning unit 13 in this case selects an adjustment amount "2" of the second highest adjustment count and an adjustment parameter "equipment/worker count change", which is associated with the adjustment amount "2", and generates (regenerates) a production plan based on the selected parameter "equipment/worker count change" and its associated adjustment amount "2 workers". The planning unit 13 then moves the processing to Step S25. The planning unit 13 repeats this until determination "no adjustment necessary" is made in Step S26, or until there is no knowledge left to apply.

The mother factory often uses overtime as a way to make a plan adjustment in order to solve a capacity shortage, as can be seen in the example of FIG. 5. The child factory that is the base "P1", on the other hand, often uses equipment/worker count change, instead of overtime, to make a production adjustment as can be seen in the example of FIG. 9. By generating the combined plan adjustment knowledge 41, the plan generating device 1 successfully generates a production plan for the child factory that is suited to the circumstances of the child factory while making use of the mother factory's know-how about adjusting a production plan.

When the planning unit 13 determines in Step S26 that the production plan does not need an adjustment ("No" in Step S26), the output unit 14 outputs the production plan generated by the planning unit 13 to the terminal device 3 (Step S28). The operator of the terminal device 3 thus obtains a production plan for the child factory.

The output unit 14 may output the production plan generated by the planning unit 13 to a terminal device that is managed by the child factory.

Figure 16:
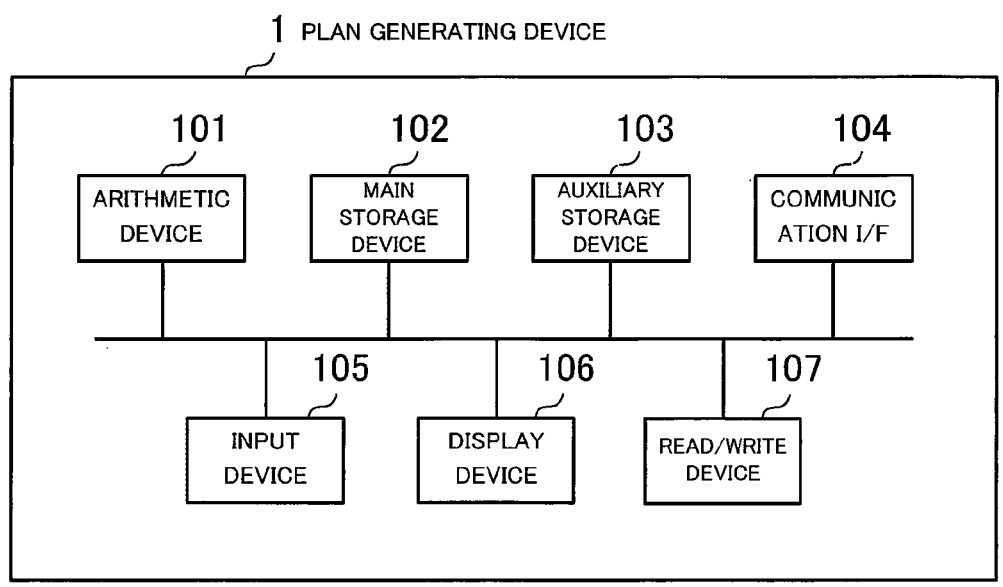
FIG. 16 is a diagram for illustrating a hardware configuration example of a plan generating device 1.

FIG. 16 is a diagram for illustrating a hardware configuration example of the plan generating device 1. The plan generating device 1 can be implemented by a computer including: an arithmetic device 101, e.g., a central processing unit (CPU); a main storage device 102, e.g., a random access memory (RAM); an auxiliary storage device 103, e.g., a hard disk drive (HDD); a communication interface (I/F) 104 for connecting to a communication network in a wired or wireless manner; an input device 105, e.g., a mouse, a keyboard, a touch sensor, or a touch panel; a display device 106, e.g., a liquid-crystal display; and a read/write device 107 for reading and writing information from/to a portable storage medium, e.g., a digital versatile disc (DVD) or a solid state drive (SSD), those components being illustrated in FIG. 16 as an example.

The functions of the respective units of the plan generating device 1 are implemented by, for example, the arithmetic device 101 executing a given program loaded onto the main storage device 102 from the auxiliary storage device 103 or the like. Further, the respective storage units of the plan generating device 1 illustrated in FIG. 1 are implemented by, for example, the arithmetic device 101 utilizing the main storage device 102 or the auxiliary storage device 103.

The above-mentioned given program may be installed, for example, from a storage medium read by the read/write device 107 or from a network via the communication I/F 104.

As described above, the plan adjustment knowledge storing unit 23 of the plan generating device 1 stores plan adjustment knowledge regarding a plan adjustment that has been made to a production plan for a mother factory. The generation unit 12 generates production adjustment knowledge regarding a production adjustment that has been made at a child factory, which has a different production management level from that of the mother factory, based on the production capacity of the child factory and on the actual production performance of the child factory. The planning unit 13 generates a production plan for the child factory based on the plan adjustment knowledge stored in the plan adjustment knowledge storing unit 23 and on the child factory's production adjustment knowledge generated by the generation unit 12. The plan generating device 1 is thus capable of generating a production plan for the child factory that is suited to the circumstances of the child factory while making use of the mother factory's know-how about adjusting a production plan. The present invention also relieves the child factory of making decisions about a production adjustment on site.

When generating the combined plan adjustment knowledge 41, the planning unit 13 multiplies an adjustment count in the production adjustment knowledge of the child factory by a value that is associated with the production management level of the child factory. This enables the plan generating device 1 to generate a production plan that is suited to the production management level of the child factory.

A production plan for the child factory may be generated by the same method that is used to generate a production plan for the mother factory in the case where the production management level of the child factory rises. For example, a production plan for the child factory may be generated by following the flow chart of FIG. 13.

While the description given above takes a mother factory and a child factory as an example of bases that have different production management levels, the present invention is not limited thereto.

The functional components of the plan generating device 1 described above are classified based on the specifics of main processing for easier understanding of the configuration of the plan generating device 1. The invention of this application is not to be limited by how the components are classified or how the components are named. The configuration of the plan generating device 1 may be classified into more components based on the specifics of processing. The components may also be classified so that one component executes more processing procedures. Processing procedures of the respective components may be executed by a single piece of hardware or by a plurality of pieces of hardware.

Processing units of the flow charts described above are divided based on the specifics of main processing for easier understanding of processing that is executed by the plan generating device 1. The invention of this application is not to be limited by how the processing units are divided or how the processing units are named. The processing of the plan generating device 1 may be divided into more processing units based on the specifics of processing. The processing units may also be divided so that one processing unit includes more processing procedures. The present invention can also be provided as a program for implementing the functions of the plan generating device 1, and as a storage medium having the program stored thereon.

Some or all of the components, functions, processing portions, and the like described above may be implemented by hardware by, for example, designing those as an integrated circuit. Control lines and information lines considered necessary for description are illustrated, but not all control lines and information lines necessary for a product are illustrated. It may be considered that almost all configurations are actually mutually connected to each other.

The technical components according to the embodiments may be applied as a single part, or divided into a plurality of parts, such as a program component and a hardware component, to be applied.

What is claimed is:

1. A plan generating method for causing a computer to execute:
   generating a production adjustment knowledge plan made for a second base, wherein the second base has a production management level different from a production management level of a first base, based on production capacity and production performance; and
   generating a production plan for the second base, based on the production adjustment knowledge and on plan adjustment knowledge, wherein the plan adjustment knowledge production plan for the first base is stored in a memory;
   the plan adjustment knowledge is configured with a plan adjustment parameter, which indicates what type of plan adjustment has been made to the production plan for the first base, an adjustment amount of the plan adjustment parameter, and an adjustment count that indicates how many times the adjustment using the plan adjustment parameter has been made in the adjustment amount of the plan adjustment parameter, and
   wherein the production adjustment knowledge is further configured with a production adjustment parameter, which indicates what type of production adjustment has been made at the second base, an adjustment amount of the production adjustment parameter, and an adjustment count that indicates how many times the adjustment using the production adjustment parameter has been made in the adjustment amount of the production adjustment parameter.

2. A plan generating device, comprising:
   a memory that stores a plan adjustment knowledge production plan made for a first base;
   a processor coupled to the memory, wherein the processor:
   generates a production adjustment knowledge plan made for a second base, wherein the second base has a production management level different from a production management level of the first base, based on production capacity and production performance; and
   a planning unit generates a production plan for the second base based on the plan adjustment knowledge and on the production adjustment knowledge;
   the plan adjustment knowledge is configured with a plan adjustment parameter, which indicates what type of plan adjustment has been made to the production plan for the first base, an adjustment amount of the plan adjustment parameter, and an adjustment count that indicates how many times the adjustment using the plan adjustment parameter has been made in the adjustment amount of the plan adjustment parameter, and
   wherein the production adjustment knowledge is further configured with a production adjustment parameter, which indicates what type of production adjustment has been made at the second base, an adjustment amount of the production adjustment parameter, and an adjustment count that indicates how many times the adjustment using the production adjustment parameter has been made in the adjustment amount of the production adjustment parameter.

3. The plan generating device according to claim 2, wherein the planning unit generates a combined plan adjustment knowledge by adding the adjustment amount of the production adjustment parameter and the adjustment count of the production adjustment parameter to the adjustment amount of the plan adjustment parameter and the adjustment count of the plan adjustment parameter, and generates a production plan for the second base based on the combined plan adjustment knowledge.

4. The plan generating device according to claim 3, wherein when the production plan for the second base fails to meet a given evaluation standard, the planning unit obtains one adjustment amount at a time from the combined plan adjustment knowledge in descending order of adjustment count, and generates a new production plan for the second base based on the obtained adjustment amount.

5. The plan generating device according to claim 4, wherein the adjustment count in the combined plan adjustment knowledge is multiplied by a value that is associated with the production management level of the second base.

6. The plan generating device according to claim 2, further comprising an output unit that outputs the production capacity, the production performance, and a change to the production adjustment knowledge to a display device.

7. The plan generating device according to claim 2, further comprising an output unit that outputs the production plan to a terminal device managed by the second base.

* * * * *